(12) United States Patent  
Hines

(10) Patent No.: US 8,932,441 B2  
(45) Date of Patent: Jan. 13, 2015

(54) ON-DEMAND HYDROGEN GENERATION

(76) Inventor: Jeffrey Hines, Cardiff, CA (US)

( * ) Notice: Subject to any disclaimer, the term of this patent is extended or adjusted under 35 U.S.C. 154(b) by 356 days.

(21) Appl. No.: 13/619,189

(22) Filed: Sep. 14, 2012

(65) Prior Publication Data

US 2013/0065142 A1 Mar. 14, 2013

Related U.S. Application Data

(60) Provisional application No. 61/534,825, filed on Sep. 14, 2011.

(51) Int. Cl.
*C25B 9/00* (2006.01)
*H01M 8/06* (2006.01)
*C25B 9/06* (2006.01)
*C25B 1/04* (2006.01)

(52) U.S. Cl.
CPC .............. *H01M 8/0656* (2013.01); *C25B 9/06* (2013.01); *Y02E 60/50* (2013.01)
USPC ............................ 204/278; 204/272; 205/628

(58) Field of Classification Search
USPC ....................................................... 204/278
See application file for complete search history.

(56) References Cited

U.S. PATENT DOCUMENTS

| | | | |
|---|---|---|---|
| 6,585,882 B1* | 7/2003 | Su et al. ...................... | 205/687 |
| 6,939,458 B1* | 9/2005 | Nishimura et al. ........... | 205/742 |
| 2006/0180464 A1* | 8/2006 | Griffin ........................ | 204/280 |
| 2010/0122902 A1* | 5/2010 | Shmueli et al. .............. | 204/278 |

* cited by examiner

*Primary Examiner* — Bryan D. Ripa
(74) *Attorney, Agent, or Firm* — TD Foster; Thomas D. Foster; Bruce Hare

(57) ABSTRACT

A system adapted to generate hydrogen and oxygen for use in hydrogen-based fuel cells is described. The system includes a power source, a first conducting element connected to a positive terminal of the power source, a second conducting element connect to a negative terminal of the power source, and a conducting medium adapted to electrically connect the first conducting element to the second conducting element.

8 Claims, 3 Drawing Sheets

ON-DEMAND HYDROGEN GENERATION

CROSS-REFERENCE TO RELATED APPLICATIONS

This application claims priority to U.S. Provisional Patent Application Ser. No. 61/534,825, filed on Sep. 14, 2011.

BACKGROUND

Hydrogen fuel cells are a promising source of clean power. Various vehicles and systems may use hydrogen fuel cells to generate power.

Thus, there is a need for a simple, cost-effective solution that will allow on-demand generation of hydrogen and/or oxygen.

BRIEF SUMMARY

Some embodiments provide a system adapted to produce hydrogen gas through electrical oxidation of metal. Such a system may provide on-demand hydrogen for use in homes or businesses. The system may provide hydrogen and/or oxygen to be stored and used by hydrogen-powered vehicles. In some embodiments, the ratio of hydrogen to oxygen may be controlled based on various features of the system. Some embodiments may include a vessel with two conducting elements that are separated by non-conducting elements. The conducting elements may be connected to positive and negative terminals, respectively, of a voltage source. The conducting elements may be electrically connected through a conducting medium (e.g., a medium including water, a catalyst, and various metal components). During operation, the liquid components of the conducting medium may be circulated (e.g., using a pump) such that the liquid flows over the solid components of the medium (e.g., the metal components). The hydrogen and oxygen generated by the system may be passed through an outlet to a storage vessel, as appropriate.

One exemplary embodiment of the system is adapted to generate hydrogen and oxygen for use in hydrogen-based fuel cells. The system includes a power source, a first conducting element connected to a positive terminal of the power source, a second conducting element connect to a negative terminal of the power source, and a conducting medium adapted to electrically connect the first conducting element to the second conducting element.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
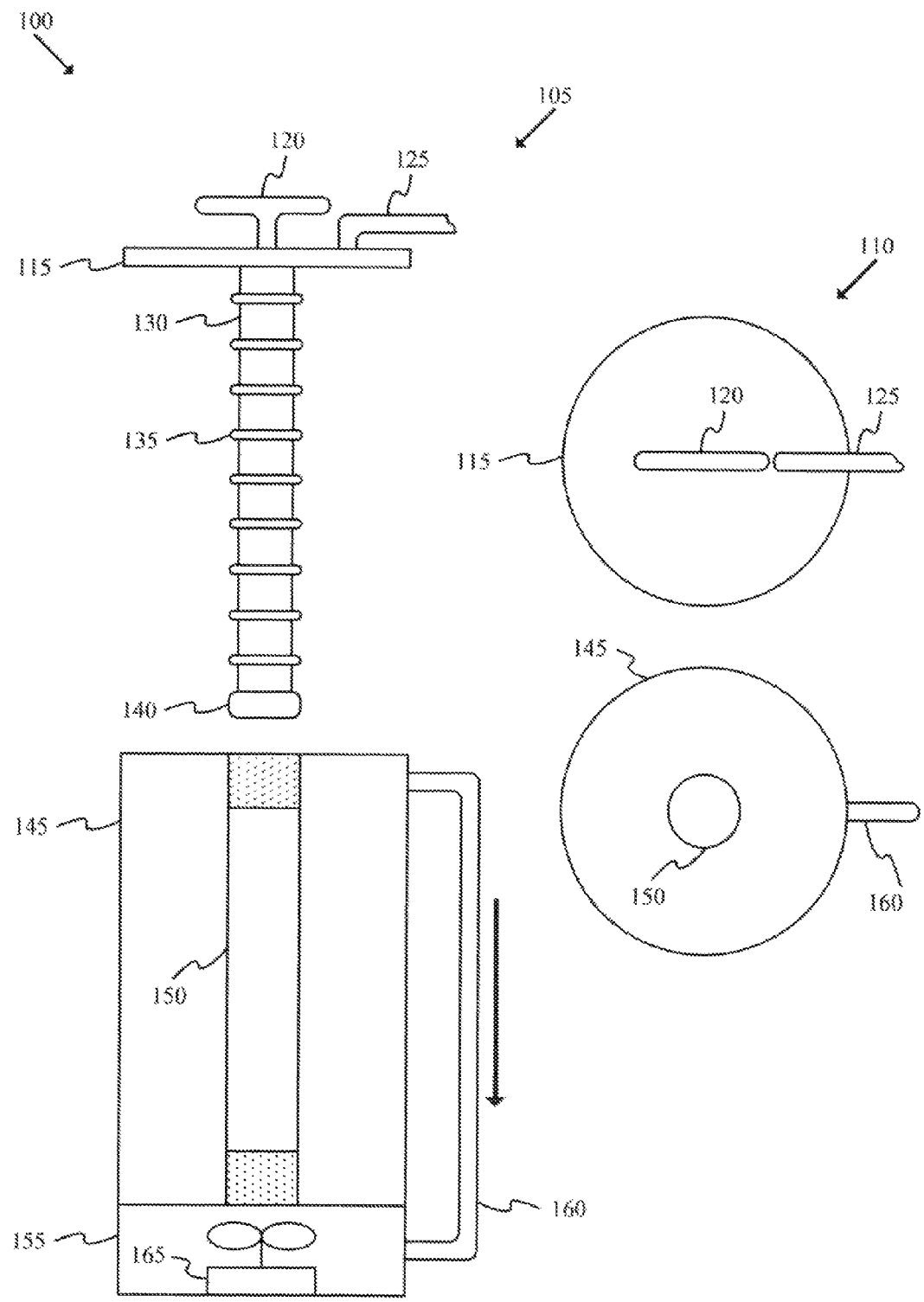
FIG. 1 illustrates side and top views of an on-demand hydrogen system according to an exemplary embodiment the invention.

FIG. 1 illustrates a side view 105 and top view 110 of an on-demand hydrogen system 100 according to an exemplary embodiment the invention. As shown, the system 100 may include a lid 115 that may include a handle 120, outlet tube 125, conducting rod 130, insulating rings 135, and an insulating cap 140. In addition, the system 100 may include a vessel 145 that may include a hollow tube 150, a base 155, and a circulating tube 160. The base may include a pump 165 or other appropriate element.

The lid 115 may be formed from a combination of conducting and insulating elements, as appropriate. For example, the conducting rod 130 may include stainless steel and/or other appropriate conducting materials while the insulating rings 135 and insulating cap 140 may include plastic and/or other appropriate non-conducting materials. The outlet tube or port 125 may include any appropriate connecting elements or materials that are capable allowing hydrogen and/or oxygen to flow out of the lid 115. The outlet tube 125 may also include various features that allow the hydrogen and oxygen to be separated and/or passed along separate pathways. The outlet tube 125 may be connected to various elements such as one or more storage tanks, one or more supply lines, etc.

The vessel 145 may be cylindrically shaped (or have other appropriate shapes) and may be made of a conducting material (e.g., stainless steel). The hollow tube 150 may be made of a conducting material (e.g., stainless steel), and may include circulation holes at various locations along the tube. In this example, the circulation holes are included at regions at the top and bottom of the tube 150. One of ordinary skill in the art will recognize that the holes could be placed at various other locations, as appropriate (e.g., along the entire surface of the tube, in various patterns, etc.). The tube 150 may be connected to the base 155 using a weld and/or other appropriate ways. The circulating tube 160 may include various connecting elements capable of forming a fluid pathway (e.g., ports, hoses, clamps, etc.). The vessel 145 may be filled, during operation, with a conducting medium that includes a solution and various metal pieces.

The base 155 may form a portion of the vessel 145. The base 155 may be separated from the main body of the vessel such that the metal pieces do not pass into the base (e.g., the base may be separated from the main body of the vessel by a mesh or other semi-permeable layer) while the conducting solution is able to pass through the base and be circulated through the tube 160 (and thus the vessel 145). In this way, the conducting solution may be continuously circulated through the metal pieces in order to increase the amount of hydrogen generated by the system.

Figure 2:
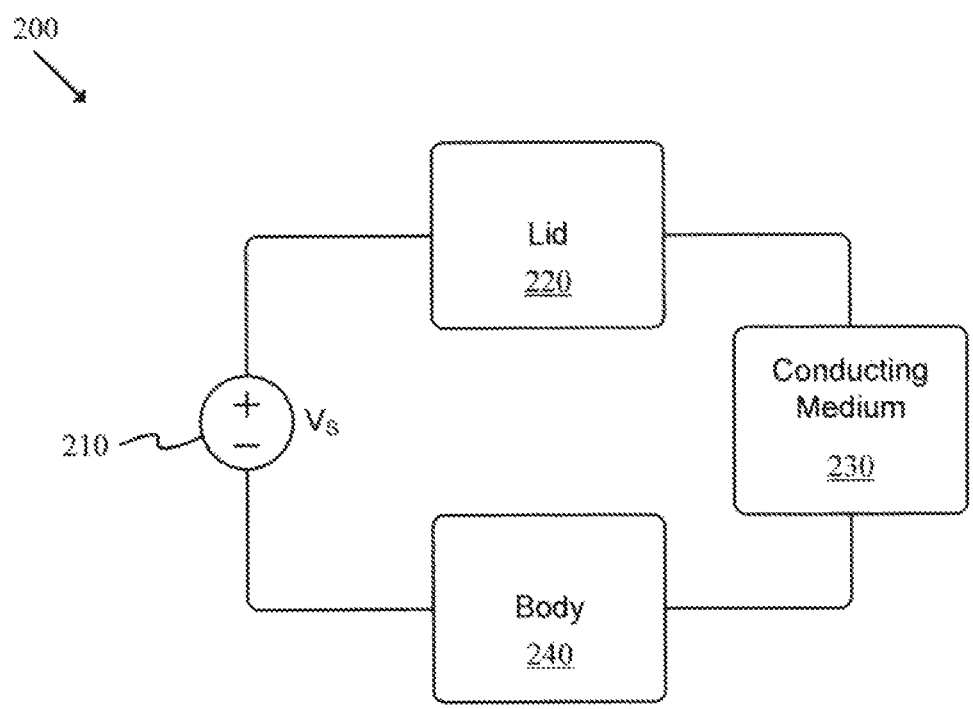
FIG. 2 illustrates a schematic block diagram of a conceptual circuit used by the system of FIG. 1.

FIG. 2 illustrates a schematic block diagram of a conceptual circuit 200 used by the system 100. As shown, the circuit may include a voltage source 210, a lid or other conducting element 220 (e.g., lid 115 described above in reference to FIG. 1), a conducting medium 230, and a body or other conducting element 240 (e.g., vessel 145 described above in reference to FIG. 1).

The voltage source 210 may be any appropriate source capable of supplying a voltage (e.g., a battery, DC power supply, etc.). The lid 220 may include stainless steel and/or other appropriate materials that may conduct current during operation and may be connected to a positive terminal of the voltage source 210.

The conducting medium 230 may include an electrolyte solution with distilled water and potassium hydroxide. In some embodiments, the potassium hydroxide may act as a catalyst to generate hydrogen gas. In addition, the conducting medium may include metal pieces (e.g., ball bearings, flakes, chips, pellets, washers, spheres, etc.). In a preferred embodiment, the metal pieces may be a uniform size. In some preferred embodiments, the metal pieces may be spherical with a diameter from about one thirty-second of an inch to about one-quarter of an inch.

The conducting medium 230 may connect the lid 220 to the body 240 (e.g., the conducting medium may fill at least a portion of the vessel 145 described above in reference to FIG. 1). The body may be made of stainless steel and/or other appropriate materials that may conduct current during operation and may be connected to a negative (or ground) terminal of the voltage source 210.

Figure 3:
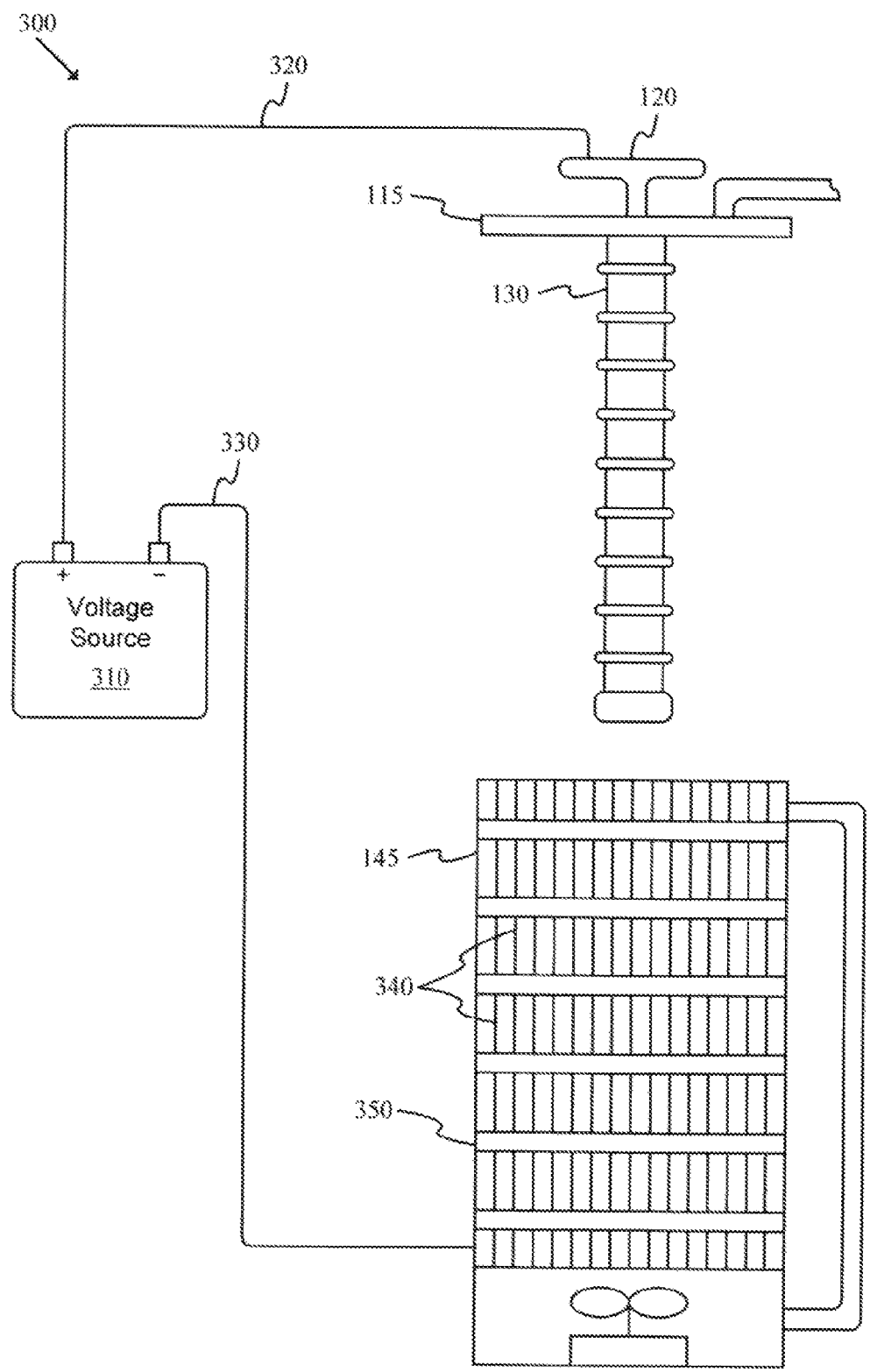
FIG. 3 illustrates an example connection scheme that may be used with the system of FIG. 1.

FIG. 3 illustrates an example connection scheme 300 that may be used with the system 100 to implement the circuit 200. In this example, a voltage source 310 has a positive terminal connected through a wire 320 to a terminal of the lid 115 that is electrically connected to the conducting rod 130. In this example, the lid terminal is part of the handle 120, but different embodiments may use different connection paths and/or components, as appropriate.

The negative terminal of the voltage source 310 may be connected through wire 330 to a set of ground wires 340 spaced around the vessel 145. The ground wires 340 may be held in place by a set of insulating clamps 350. In a preferred embodiment, the ground wires may be separated by about one-sixteenth of an inch to about one quarter of an inch. The set of ground wires 340 may form a mesh about the exterior of the vessel 145 that facilitates generation of hydrogen at locations throughout the vessel (rather than a concentration of hydrogen formed at a single ground point). The insulating clamps 350 may be made of various appropriate materials (e.g., plastic).

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. A system adapted to generate hydrogen and oxygen for use in hydrogen-based fuel cells, the system comprising:
    a power source;
    a first conducting element connected to a positive terminal of the power source;
    a second conducting element connected to a negative terminal of the power source;
    a conducting medium adapted to electrically connect the first conducting element to the second conducting element, wherein the conducting medium comprises a solution and a plurality of metallic pieces; and a base member attached at an end of the second conducting element and configured to define an area within the base into which the plurality of metallic pieces cannot pass but which the solution can.

2. The system of claim 1, wherein the solution comprises water and potassium hydroxide.

3. The system of claim 2, wherein the plurality of metallic pieces further comprises a plurality of metallic spheres.

4. The system of claim 3, wherein each metallic sphere has a uniform diameter compared to each other metallic sphere in the plurality of metallic spheres.

5. The system of claim 4, wherein each metallic sphere has a diameter between one thirty-second of an inch and one quarter of an inch.

6. The system of claim 1, wherein the second conducting element comprises a cylindrically-shaped vessel, the vessel coupled to a plurality of ground wires running along an outer surface of the vessel.

7. The system of claim 6, wherein the ground wires are spaced between one sixteenth of an inch and one quarter of an inch apart.

8. The system of claim 6 further comprising a circulating pump adapted to circulate at least a portion of the solution throughout the vessel.

\* \* \* \* \*